United States Patent [19]
Reinhard

[11] Patent Number: 4,960,547
[45] Date of Patent: Oct. 2, 1990

[54] DEVICE AND METHOD FOR THE GRANULATION OF MELTING AND SOFTENING MATERIALS

[76] Inventor: Michael Reinhard, Waldstr. 9, D-6117 Schaafheim, Fed. Rep. of Germany

[21] Appl. No.: 274,934
[22] PCT Filed: Mar. 18, 1988
[86] PCT No.: PCT/DE88/00170
  § 371 Date: Nov. 16, 1988
  § 102(e) Date: Nov. 16, 1988
[87] PCT Pub. No.: WO88/06961
  PCT Pub. Date: Sep. 22, 1988

[30] Foreign Application Priority Data
Mar. 18, 1987 [DE] Fed. Rep. of Germany ....... 3708695

[51] Int. Cl.$^5$ ................................. B29B 9/10
[52] U.S. Cl. ......................... 264/11; 264/12; 264/140; 425/7; 425/289; 425/308; 425/DIG. 230
[58] Field of Search ................. 425/5, 6, 288, 382 N, 425/DIG. 230, 289, 7, 76, 381, 156, 308, 310, 436 R, 436 RM, 437, 461; 264/4, 5, 167, 9, 11, 12, 140, 142

[56] References Cited
U.S. PATENT DOCUMENTS

| | | | |
|---|---|---|---|
| 2,566,567 | 9/1951 | Hutchinson et al. | 526/75 |
| 3,002,615 | 10/1961 | Lemelson | 264/167 |
| 3,213,170 | 10/1965 | Erdmenger et al. | 264/142 |
| 3,674,404 | 7/1972 | Burlis et al. | 264/167 |
| 3,708,253 | 1/1973 | Lemelson | 425/325 |
| 4,151,251 | 4/1979 | Kropa | 264/557 |

FOREIGN PATENT DOCUMENTS

| | | |
|---|---|---|
| 1548912 | 11/1971 | Fed. Rep. of Germany . |
| 700406 | 2/1931 | France ................................. 425/6 |
| 2160814 | 1/1986 | United Kingdom . |

*Primary Examiner*—Jay H. Woo
*Assistant Examiner*—James P. Mackey
*Attorney, Agent, or Firm*—Banner, Birch, McKie & Beckett

[57] ABSTRACT

An apparatus and method for forming discrete granules from a flow of molten plastic material is disclosed. The apparatus includes a tube having an end surface through which the molten material flows and a discharge plate having an opening therethrough disposed adjacent the tube. The discharge plate is movable with respect to the end surface of the tube. A pressure medium accumulating region is disposed adjacent the end surface of the tube. In operation, the molten material flows through the tube and into the opening of the discharge plate. The end surface of the tube and the discharge plate move into and out of contact on a periodic basis such that the tube and discharge plate function as a valve. The periodic opening and closing of the valve allows introduction of discrete amounts of the pressure medium into an annular gap formed about the flow of the molten material and between the end surface of the tube and the discharge plate such that the pressure medium concentrically surrounds and symmetrically divides the molten material into granules.

26 Claims, 4 Drawing Sheets

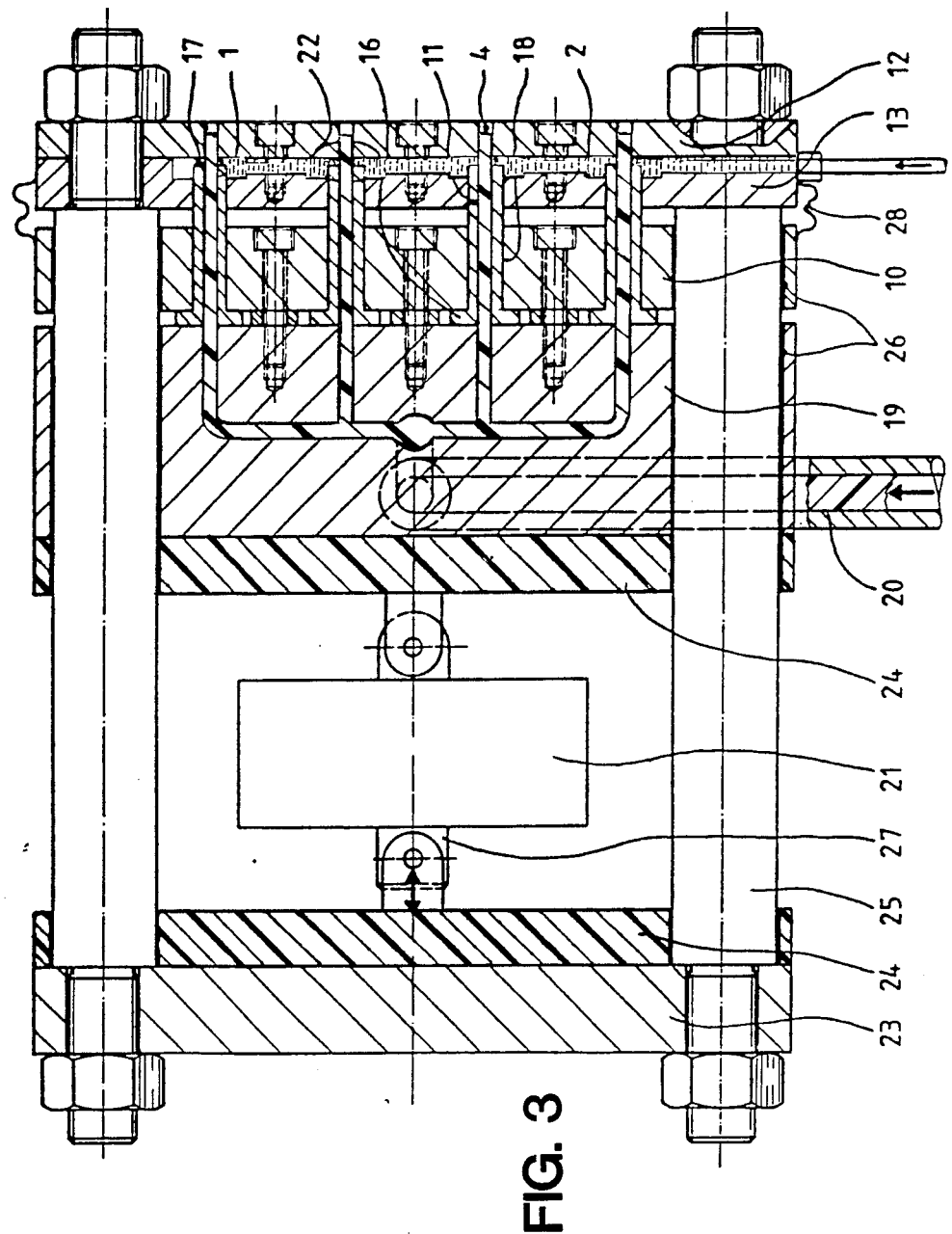

DEVICE AND METHOD FOR THE GRANULATION OF MELTING AND SOFTENING MATERIALS

BACKGROUND OF THE INVENTION

The invention relates to a device for the granulation of melting and softening materials, more particularly plastic materials, comprising a flash groove in which the material to be granulated is carried and a feedway to the flash groove through which the pressure medium under pressure is intermittently introduced as discrete amounts into the flash groove, whereby the material flow of the material to be granulated is subdivided by volume displacement into discrete portions, i.e., granules. The intermittent introduction of the pressure medium into the flash groove is controlled by the periodic opening and closing of a valve.

Examined West German Patent Application No. 15 48 912 discloses a device for the separation of flowing media into discrete, successive sections which are separated from each other by injecting sections of another medium that is immiscible with the medium to be divided. For this purpose, both media are first carried through separate lines to a junction, where the dividing medium is injected from one side into the line carrying the medium to be divided. For this purpose, the dividing medium is compressed via a pulsating dosing unit into a feed line from which it is injected at the junction into the medium to be divided. Because of the admission of the dividing medium by means of the feed line, there may arise in this feed line, particularly at high pulse frequencies, undesirable resonances or reflections that can interfere with the exact rhythmic injection of the dividing medium, so that the precise division of the medium to be divided is not assured. Moreover, turbulences may arise due to the lateral injection of the dividing medium in the junction area, which also deleteriously affect the precise division of the medium to be divided.

Furthermore, U.S. Pat. No. 4,151,251 specifically describes a process for the manufacture of plastic granules in which the plastic granules are produced by intermittent admission of a coolant into a passage carrying a plastic melt. Preferably, water is to be used as the coolant. The coolant is admitted through sintered porous metal over the surface of which the plastic melt is passed. Because of the intermittent admission of the coolant, the plastic melt repeatedly comes into direct contact with the sintered metal in the pauses between admissions. The contact between the plastic melt and the sintered metal poses the risk that small amounts of the plastic melt enter the sintered metal, remain there too long, and thus crack, as a result of which in one respect the plastic melt is repeatedly contaminated and deleteriously affected and the particular orifices concerned in the sintered metal are plugged. Furthermore, the use of the sintered metal requires the admission of highly purified water, because contaminations in the water used as the coolant can continuously clog the sintered metal. Finally, insertion of the sintered metal into the coolant supply line is not advantageous because a considerable pressure drop occurs at the sintered metal which causes a flattening of the sharp sides of the individual water hammers during the intermittent admission of coolant.

SUMMARY OF THE INVENTION

One object of the invention is to provide a structure which allows admission of the pressure medium in discrete amounts into a flash groove in which the material to be divided flows, such that the discrete amounts of pressure medium act as a plurality of fluid hammers, each of which precisely divides the material. According to the invention, this occurs because the wall of the flash groove is divided perpendicularly to the groove axis to form a joint, and the resulting two abutting edges of the flash groove are movable relatively to each other in the direction of the groove axis in such a fashion that when the abutting edges move away from each other they form an annular gap surrounding the material in the flash groove, The annular gap is connected on its outer periphery to a recess carrying the pressure medium, The surfaces of the abutting edges which face each other form the sealing surfaces of a valve which controls admission of the pressure medium to the flash groove.

This design of the periodically moving valve achieves in one respect the production of successive water hammers directly at the site where the pressure medium is introduced into the flash groove. Thus, practically no resonances of any type can arise downstream from the valve. In addition, because of the shape of the valve, the pressure medium is carried concentrically or symmetrically to the material in the flash groove which therefore receives the water hammer uniformly from all sides and is uniformly divided in this manner.

Advantageously, the abutting edges are connected to a vibrator, which presses the sealing surfaces on each other and forces them apart in periodic succession.

Advantageously, one abutting edge is made in the form of a tube, which projects with one end into the recess and the end face of which forms one of the two sealing surfaces. In this manner, the end face of the tube, which is washed by the pressure medium when the valve is open, can be used advantageously as a sealing surface.

The sealing surfaces can be fashioned as flush or as correspondingly conical. In the absence of a flush design, subsequent easing is simple, for example to restore tightness. Particularly good sealing effects can be achieved with an appropriately conical design. Also, the conical design permits shortening of the discharge section of the flash groove downstream from the valve.

Advantageously, in order to prevent with assurance the undesirable solidification of the material carried by the flash groove, flash groove, pressure medium and material to be granulated are kept at the same temperature. This also has the advantage that no undesirable distortions can arise in the device.

A liquid or a gas can be employed as the pressure medium; preferably water or air is used as the pressure medium. When selecting the pressure medium, attention should be focused on the fact that it should not react with the material carried in the flash groove and should be immiscible therewith. In addition, the pressure medium must be easily separated from the granulated material.

In order to avoid uncontrollable vaporization of the liquid employed as the pressure medium upstream from the valve, the liquid upstream from the valve is kept at an appropriately high pressure, which prevents this transformation. This type of transformation would deleteriously affect the exact dosing activity of the valve.

To facilitate the forced separation of the material carried in the flash groove, the liquid is permitted to vaporize after entry in the melt stream; of the material to be separated, causing; a spontaneous increase in volume of the pressure medium. To achieve such a vaporization, a liquid must be selected as the pressure medium and must evaporate almost instantaneously at the ambient pressure and typical temperature of the material carried in the flash groove. In the device described herein, the ambient pressure downstream from the valve is practically produced by the fact that normally no long discharge sections are connected to the valve. Rather, the invention can function with short discharge sections.

In order to impair as little as possible the form of the discrete material portions produced by the operation of the valve through effects brought about by the discharge section downstream from the valve, the discharge section of the flash groove is made sufficiently short and the discrete amounts of the pressure medium are of such volume that at any given time only one portion of material is present in the discharge section. This design also has the advantage that for all practical purposes ambient pressure prevails downstream from the valve, so that essentially instantaneous vaporization of the liquid serving as the pressure medium can occur at the discharge section. As a result the discrete portions of material are ejected from the discharge section essentially instantaneously after the valve operation.

After the emergence of discrete portions of material from the discharge section, the portions of material are cooled as granules in the usual manner.

The inventive concept will now be discussed with reference to practical embodiments.

BRIEF DESCRIPTION OF THE DRAWINGS

FIG. 3 shows a device with a plurality of flash grooves and jointly operated valves.

DETAILED DESCRIPTION OF THE PREFERRED EMBODIMENTS

Figure 1A:
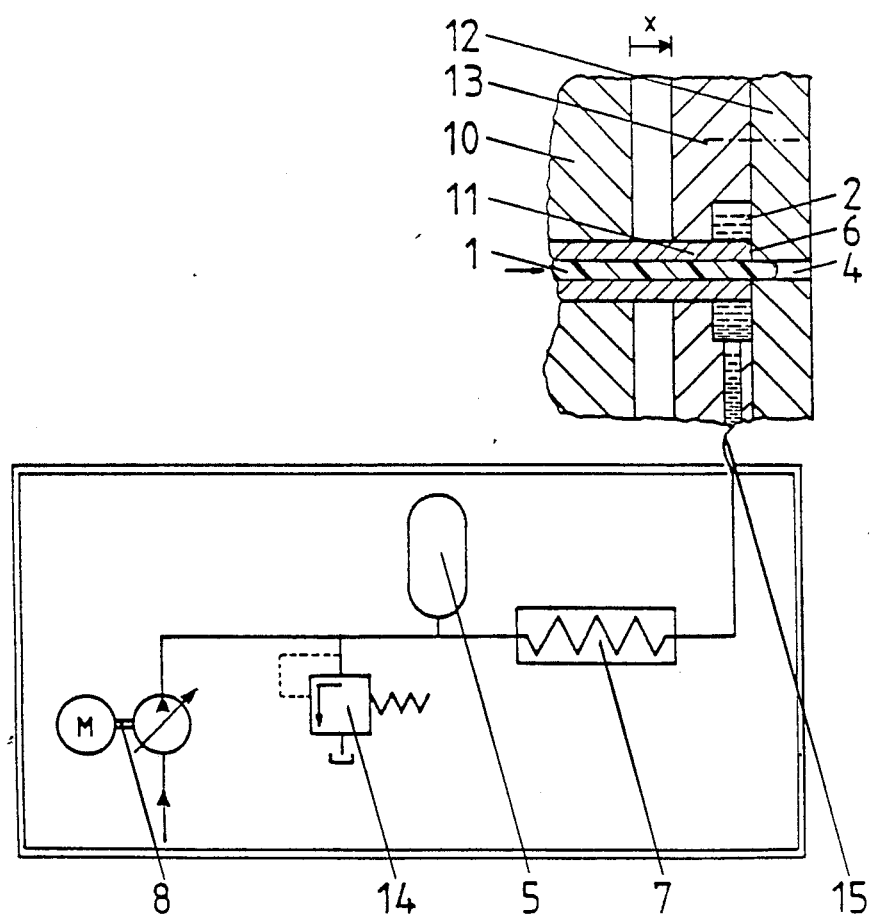
FIG. 1 is a cross-sectional view of he device in several operation phases.
Figure 1B:
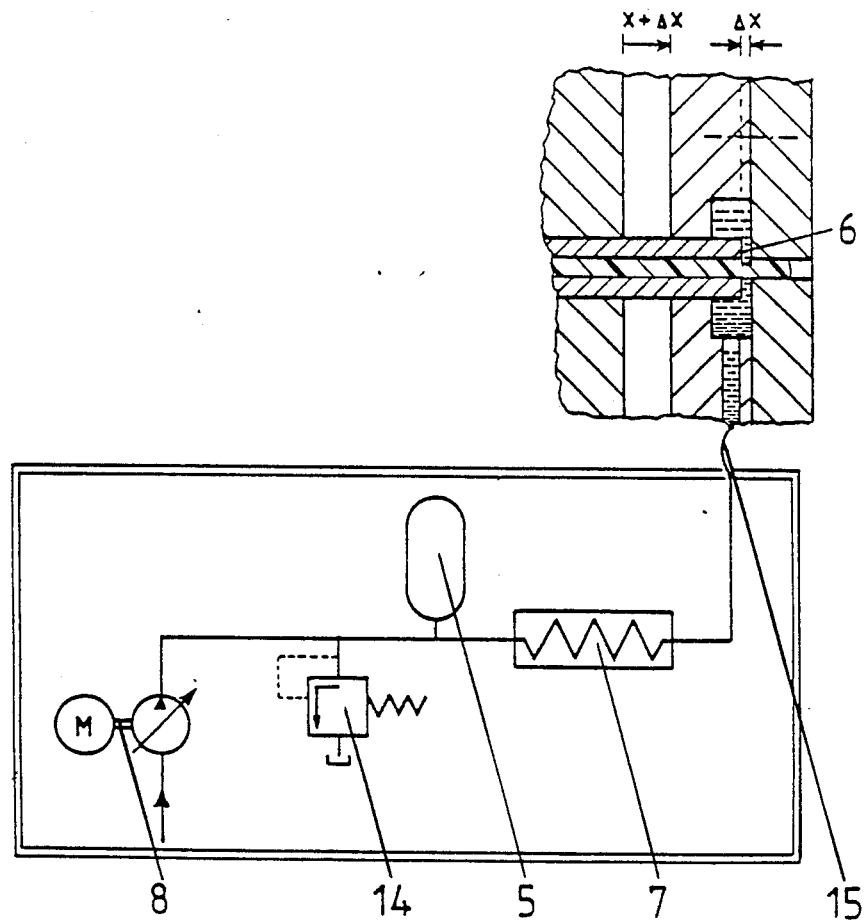

The inventive concept will now be discussed with reference to one practical embodiment. FIG. 1 shows the principle underlying the granulator embodying the invention.

Base plate (10) includes thick walled tube (11) projecting therethrough. The bore of tube (11) along with a corresponding bore through discharge plate (12) constitute flash groove (4) such that the molten material to be granulated (1) flows through the flash groove (4). Both tube (11) and base plate (10) are fixed. Discharge plate (12) and manifold plate (13) fixed thereto move with respect to tube (11) such that the opposed surfaces of tube (1) and plate (12) move into and out of contact, effectively creating inlet valve (6). In phase 1 of the granulation process, the end face of the thick-walled tube abuts on the discharge plate (12) and prevents the entry of the pressure medium (2) into the flash groove. The inlet valve (6) is thus closed. The pressure medium (2) is located in recesses of the manifold plate (13), which is firmly joined to the discharge plate (12). Pressure medium 2 is under extremely high pressure produced by the pressure generator (8) and possesses a very high temperature due to the instantaneous water heater (7). The entire processing section of the granulator made up of base plate (10), one or more thick-walled tubes (11), discharge plate (12), manifold plate (13), and other parts, is heated as well. In addition to the instantaneous water heater (7) and the pressure generator (8), a reservoir (5) and the safety valve (14) are also part of the supply section. The supply section is linked to the processing section by means of a flexible connection (15).

In phase 2 of the granulation process, the discharge plate (12) and the manifold plate (13) are moved away for the distance delta x from the base plate (10) and the thick-walled tube (11), causing the inlet (6) to be opened, and the pressure medium (2), e.g., water, enters the groove (4) due to the pressure gradient. A small annular gap is created between the end surface of tube (11) and the opposing surface of discharge plate (12), and around the flow of molten material in the flash groove. The outer periphery of the annular gap is linked to the pressure medium in the recess in plate (13). Thus, the pressure medium surrounds the molten material concentrically when the valve opens, and uniformly divides the molten material in a symmetric manner.

In phase 3, the inlet (6) is closed once again. During this procedure, the pressure medium (2), in this case water, entering the groove (4) transforms into vapor (9) due to the considerably lower pressure in the groove (4) and separates the granules (3) from the melt stream (1), projecting the separated granule into the open because of the appreciable increase in volume.

In the device depicted in FIG. 1, the end face of tube 11 and the surface of the discharge plate 12 facing the end face form the joint of the flash groove 4. The discharge plate 12 thus constitutes the outlet of the flash groove. The joint is formed by abutting the portions of the two edges I and II. The abutting edge I includes the surfaces of the tube 11 and the base plate 10 and abutting edge II including the surfaces of manifold plate 13 and the discharge plate 12. The end face, facing the discharge plate, of the tube 11 together with the opposing surface of the discharge plate 12 form the valve (6).

The following list of data and parameters for a practical application serves to clarify further the mode of operation of the strand cutter incorporating the invention.

Plastic to be granulated:

| Polypropylene with 30% talc | |
| --- | --- |
| Temperature of plastic metal | 195° C. |
| Temperature of processing section | 195° C. |
| Temperature of pressure medium | 195° C. |
| Pressure in pressure medium (upstream from the inlet) | 50 bar |
| Pressure in flash groove (near inlet) | 5 bar |
| Distance traversed delta x | 2/10 mm |

Figure 2:
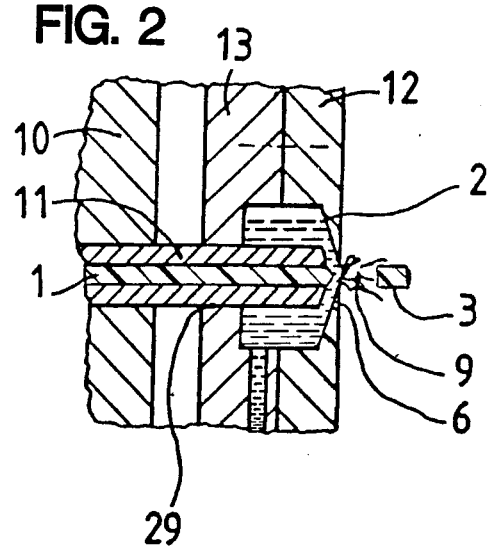
FIG. 2 is a cross-sectional view of the device in which the sealing surfaces of the valve have a conical structure.
Figure 1C:
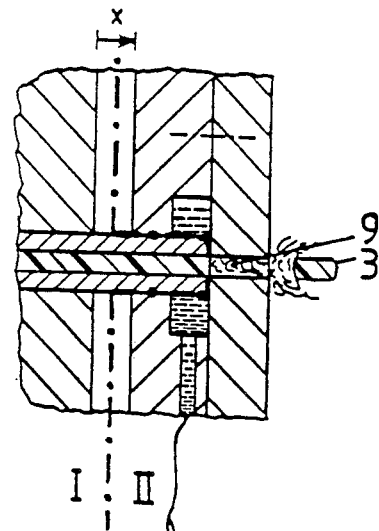
Figure 1C:
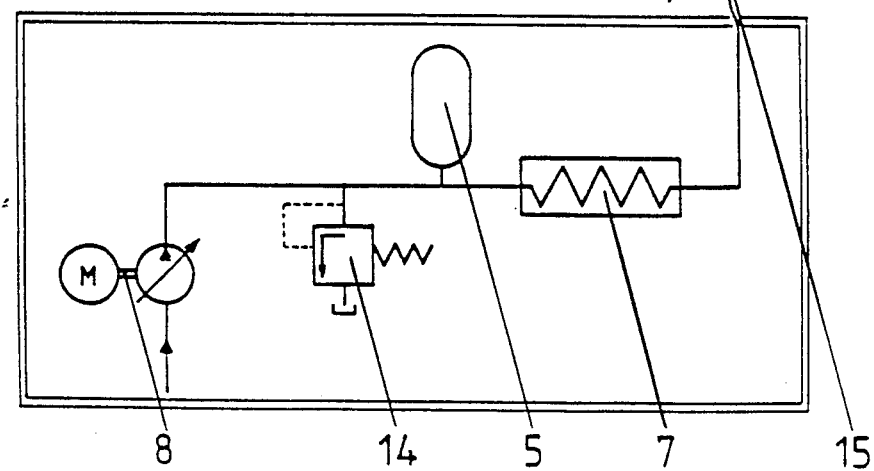

A variation of the illustration in FIG. 1, phase 2, is shown in FIG. 2. According to FIG. 1, the sealing surfaces, formed by the end face of tube 11 and the relevant portion of discharge plate 12 abut flush against each other. In the arrangement shown in FIG. 2, the corresponding sealing surfaces are formed conically, producing a particularly good seal. In addition, a recess corresponding to the recess in manifold plate (13) is formed in discharge plate (12), such that the overall shape of the recess in which the pressure medium (2) is collected is conically elongated. The length of tube (11) is also extended as compared with FIG. 1 and the thickness of the outlet of flash groove (4) formed in discharge plate (12) is reduced as compared with the embodiment shown in FIG. 1.

FIG. 3 shows the construction of a novel granulator with a plurality of flash grooves 4 connected in parallel. The tubes (11), which are provided with collars (16) on the side opposite from end surface (17) are disposed in bores (18) formed through base plate (10). Collars (16) are clamped into position between base plate (10) and main plate (19), which are fixed together by a plurality of bolts. Tubes (11) extend through openings in manifold plate (13) which is fixed to discharge plate (12) by a further plurality of bolts. The combination of manifold plate (13) and discharge plate (12) is fixedly mounted on guide pins (25) by further bolts. A plurality of inlet valves (22) are formed by the end surfaces of tubes (11) and the adjacent portions of the opposing surface of discharge plate (12). By virtue of this design, tubes (11) can be easily changed in the event of damage or wear by removal of plates (10), (12), and (13) and the corresponding bolts. The distribution of the plastic melt 20 into the individual streams of material 1 occurs in the main plate 19.

Furthermore, oscillator 21 and the mechanical system with which the motion to open and close the valves 22 is effected are shown. Oscillator 21 is placed between the main plate 19 and the coupling plate 23 and is thermally separated from both plates by insulation plates 24. The main plate 19, the base plate 10, the manifold plate 13, the discharge plate 12, and the coupling plate (23) are heated to prevent jamming of the guide pins 25 disposed in the slideways 26 located in the base plate 10 and in the main plate 19. The guide pins 25 are screwed firmly together with the coupling plate 23 on one side and firmly together with the manifold plate 13 and the discharge plate 12 on the other side. Thus, all valves 22 are simultaneously closed by the release of the actuating pin 27 of the oscillator (21) which causes main plate (19), and tubes (11) and base plate (10) fixedly secured thereto, to move towards discharge plate (12) such that tubes (11) contact discharge plate (12. Valves (22) are opened by the backward motion of plate (19). In this way, the pressure medium 2, can be introduced in precise doses into the flash groove 4.

The vapor emerging from the controlled-gap seals (29 in FIG. 2) can be collected with the metal bellows 28 and carried away in a controlled fashion.

I claim:

1. An apparatus for granulating molten material, said apparatus comprising at least one tube having an end surface through which the molten material flows, a discharge plate having an opening therethrough disposed adjacent said tube, said opening disposed adjacent said tube such that molten material flows from said tube to said opening, at least one of said tube and said discharge plate movable with respect to the other such that the end surface of said tube and said discharge plate are periodically in contact and thereby form a valve which periodically opens and closes, a pressure medium feed means for feeding pressurized medium to an accumulating region adjacent said valve where the pressure medium accumulates, wherein the periodic opening and closing of said valve allows the periodic introduction of discrete amounts of said pressure medium to the flow of the molten material thereby dividing the molten material into discrete granules.

2. The apparatus recited in claim 1, said accumulating region comprising an annular recess formed about said end surface of said tube, said pressure medium feed means linked to said annular recess, the opening of said valve creating an annular gap between the end surface of said tube and the discharge plate and about the flow of molten material and allowing introduction of said discrete amounts of said pressure medium to the annular gap such that said pressure medium concentrically surrounds and symmetrically divides said flow.

3. The apparatus recited in claim 2 further comprising a manifold plate fixed to said discharge plate and having an indented region formed therein, said manifold plate further comprising an opening therethrough which is adjacent said indented region, said tube disposed through said opening of said manifold plate such that said annular recess is formed in said indented region about the end of the tube.

4. The apparatus recited in claim 3, said discharge plate comprising a conical recess formed at said opening through said discharge plate and adjacent said indented region, said end surface of the tube angled with respect to the outer surface of the tube, said angle corresponding to the peripheral surfaces of said conical recess.

5. The apparatus in claim 3, wherein said annular recess is linked to said pressure medium feed means by a channel formed in said manifold plate.

6. The apparatus recited in claim 1, wherein said tube is fixedly disposed and said discharge plate is movable with respect to said tube.

7. The apparatus recited in claim 6 further comprising a fixed base plate having an opening therethrough, said tube fixedly disposed in said opening of said base plate.

8. The apparatus recited in claim 1 further comprising a temperature maintaining means for maintaining said molten material and said pressure medium at the same temperature.

9. The apparatus recited in claim 1, said pressure medium comprising a fluid.

10. An apparatus for granulating molten material comprising a main plate having a plurality of channels, a plurality of tubes fixed to said main plate, one said tube disposed adjacent each said channel and said tubes and said channels jointly creating a plurality of molten material flow paths such that molten material flows through said channels and out of openings disposed through an end surface of said tubes, a discharge plate having openings therethrough disposed adjacent said tubes, said openings in said discharge plate disposed adjacent the end surface of said tubes, said main plate and tubes movable with respect to said discharge plate such that the end surfaces of said tubes and said discharge plates are periodically in contact and thereby form a plurality of valves which periodically open and close, a pressure medium feed means for feeding pressurized medium to a plurality of accumulating regions where the pressure medium accumulates, one said region disposed adjacent each said valve, wherein the periodic opening and closing of said valves allows the periodic introduction of discrete amounts of said pressure medium to the flow of the molten material thereby dividing the molten material into discrete granules.

11. The apparatus recited in claim 10, said accumulating regions each comprising a plurality of annular recesses, one said annular recess formed about said end surface of each of said tubes, said pressure medium feed means linked to said annular recesses, the opening of said valves creating an annular gap between said end surfaces of said tubes and said discharge plate and about the flow of molten material and allowing introduction of said discrete amounts of said pressure medium to the annular gaps such that said pressure medium concentrically surrounds and symmetrically divides said flow of molten material.

12. The apparatus recited in claim 11 further comprising a manifold plate fixed to said discharge plate and having a plurality of indented regions formed therein, said manifold plate further comprising a plurality of openings therethrough which are adjacent said indented regions, said tubes disposed through said openings of said manifold plate such that said annular recesses are formed in said indented regions about said tubes.

13. The apparatus recited in claim 12 further comprising a plurality of guide pins, said main plate further comprising a plurality of peripheral slideway holes formed therethrough, said main plate movably disposed on said guide pins at said peripheral holes such that said guide pins extend beyond said peripheral holes, said discharge plate fixedly disposed on the extending portions of said guide pins, movement of said main plate on said guide pins causing said valves to open and close.

14. The apparatus recited in claim 13, said tubes having peripherally formed collars disposed against the surface of said main plate, said apparatus further comprising a base plate having a plurality of openings formed therethrough, said base plate fixedly attached to said main plate such that said plurality of tubes extends through and beyond said openings in said base plate, said base plate clamping said collars of said tubes against said main plate.

15. The apparatus recited in claim 14 further comprising a coupling plate fixedly disposed on an end of said guide pins opposite from said discharge plate and an oscillating means disposed between said coupling plate and said main plate for causing said main plate to oscillate to open and close said valves.

16. The apparatus recited in claim 12, said tubes having peripherally formed collars disposed against the surface of said main plate, said apparatus further comprising a base plate having a plurality of openings formed therethrough, said base plate fixedly attached to said main plate such that said plurality of tubes extends through and beyond said openings in said base plate, said base plate clamping said collars of said tubes against said main plate.

17. The apparatus in claim 10 further comprising a plurality of guide pins, said main plate further comprising a plurality of peripheral slideway holes formed therethrough, said main plate movably disposed on said guide pins at said peripheral holes such that said guide pins extend beyond said peripheral holes, said discharge plate fixedly disposed on the extending end portions of said guide pins, movement of said main plate on said guide pins causing said valves to open and close.

18. The apparatus recited in claim 17, said tubes having peripherally formed collars disposed against the surface of said main plate, said apparatus further comprising a base plate having a plurality of openings formed therethrough, said base plate fixedly attached to said main plate such that said plurality of tubes extends through and beyond said openings in said base plate, said base plate clamping said collars of said tubes against said main plate.

19. A method for granulating molten material, said method comprising the steps of:
causing said molten material to flow through at least one channel and out of an end surface thereof;
causing said molten material flowing from said end surface to further flow through an opening in an adjacent plate, said opening corresponding to said at least one channel;
introducing a pressure medium to an accumulating region located adjacent the end surface of said at least one channel; and
periodically moving one of said channel and said plate with respect to the other to allow periodic introduction of discrete amounts of said pressure medium to the flow of the molten material and thereby dividing the molten material into discrete granules.

20. The method recited in claim 19 further comprising the step of forming said accumulating region concentrically about the end surface of said at least one channel, said periodic movement of one of said channel or said plate creating an annular gap between the end surface of said channel and said plate and about the flow of molten material and allowing introduction of said discrete amounts of said pressure medium to said annular gap such that said pressure medium symmetrically divides the molten material.

21. The method recited in claim 20 comprising the further step of maintaining the pressure medium and said molten material at approximately the same temperature.

22. The method recited in claim 21, said pressure medium comprising a gas.

23. The method recited in claim 20, said pressure medium comprising a liquid maintained at a sufficiently high pressure at a location upstream from the annular gap so that the liquid does not vaporize before it reaches said annular gap, said liquid vaporizing in said annular gap, said vaporizing liquid increasing in volume and forcibly separating the molten material such that a granule is formed and propelled from said opening in said plate.

24. The method recited in claim 23 said at least one channel comprising a plurality of channels having a corresponding plurality of openings in said plate.

25. The method recited in claim 20 said at least one channel comprising a plurality of channels having a corresponding plurality of openings in said plate.

26. The method recited in claim 19 said at least one channel comprising a plurality of channels having a corresponding plurality of openings in said plate.

* * * * *